United States Patent [19]

Souissi

[11] Patent Number: 5,825,811
[45] Date of Patent: Oct. 20, 1998

[54] METHOD AND APPARATUS FOR FACILITATING INBOUND CHANNEL ACCESS

[75] Inventor: Slim Souissi, Fort Worth, Tex.

[73] Assignee: Motorola, Inc., Schaumburg, Ill.

[21] Appl. No.: 786,380

[22] Filed: Jan. 16, 1997

[51] Int. Cl.⁶ .............................. H04B 1/713; H04J 3/16
[52] U.S. Cl. .................... 375/202; 370/437; 370/447; 370/458; 370/462; 455/509; 340/825.03
[58] Field of Search .................................. 375/200, 202; 370/437, 442, 445, 447, 458, 462; 455/450, 452, 509; 340/825.03

[56] References Cited

U.S. PATENT DOCUMENTS

| | | | |
|---|---|---|---|
| 5,430,759 | 7/1995 | Yokev et al. | |
| 5,586,120 | 12/1996 | Cadd | 370/468 |
| 5,619,493 | 4/1997 | Ritz et al. | 370/330 |
| 5,638,369 | 6/1997 | Ayerst et al. | 370/346 |
| 5,644,576 | 7/1997 | Bauchot et al. | 370/437 |
| 5,657,343 | 8/1997 | Schilling | 375/202 |

*Primary Examiner*—Don N. Vo
*Assistant Examiner*—Amanda T. Le
*Attorney, Agent, or Firm*—R. Louis Breeden

[57] ABSTRACT

Inbound channel access is facilitated in a two-way messaging system (FIG. 1) utilizing a frequency-hopped spread-spectrum modulation technique on a set of hopping frequencies. First and second subsets of the set of hopping frequencies are defined (504), the first and second subsets being orthogonal to one another. Scheduled transmissions are communicated (514) on the first subset, and ALOHA transmissions are communicated (514) on the second subset.

15 Claims, 4 Drawing Sheets

METHOD AND APPARATUS FOR FACILITATING INBOUND CHANNEL ACCESS

FIELD OF THE INVENTION

This invention relates in general to radio communication systems, and more specifically to a method and apparatus for facilitating inbound channel access in a two-way messaging system.

BACKGROUND OF THE INVENTION

Two-way messaging systems are growing in popularity. Such systems provide greater message delivery reliability and can include the ability to originate messages from portable subscriber units operating in the system. A proposed two-way messaging system uses frequency-hopped spread spectrum modulation techniques for the inbound channel. Inbound channel messages include scheduled messages, which are responses to outbound messages, and unscheduled (ALOHA) messages, which are originated spontaneously by the subscriber unit using a timeslot randomly selected from a plurality of predetermined ALOHA timeslots.

Prior art systems have generally used time division techniques for separating the scheduled messages from the ALOHA messages. Unfortunately, time division techniques can increase message latency, thus slowing the communications.

Thus, what is needed is a method and apparatus for facilitating inbound channel access. The method and apparatus preferably will operate without causing significant message latency.

SUMMARY OF THE INVENTION

An aspect of the present invention is a method for facilitating inbound channel access in a two-way messaging system utilizing a frequency-hopped spread-spectrum modulation technique on a set of hopping frequencies. The method comprises the step of defining first and second subsets of the set of hopping frequencies, the first and second subsets being orthogonal to one another. The method further comprises the steps of communicating scheduled transmissions on the first subset, and communicating ALOHA transmissions on the second subset.

Another aspect of the present invention is a portable subscriber unit in a two-way messaging system utilizing a frequency-hopped spread-spectrum modulation technique on a set of hopping frequencies. The portable subscriber unit comprises a transceiver for receiving a message from the messaging system and for generating both scheduled and ALOHA transmissions intended for the messaging system, and a processing system coupled to the transceiver for defining first and second subsets of the set of hopping sequences, the first and second subsets being orthogonal to one another. The processing system is programmed to control the transceiver to communicate scheduled transmissions on the first subset, and to communicate ALOHA transmissions on the second subset.

Another aspect of the present invention is an apparatus in a two-way messaging system utilizing a frequency-hopped spread-spectrum modulation technique on a set of hopping frequencies. The apparatus comprises a transceiver for receiving a message from the messaging system and for generating both scheduled and ALOHA transmissions intended for the messaging system, and a processing system coupled to the transceiver for defining first and second subsets of the set of hopping sequences, the first and second subsets being orthogonal to one another. The processing system is programmed to control the transceiver to communicate scheduled transmissions on the first subset, and to communicate ALOHA transmissions on the second subset.

DETAILED DESCRIPTION OF THE DRAWINGS

Figure 1:
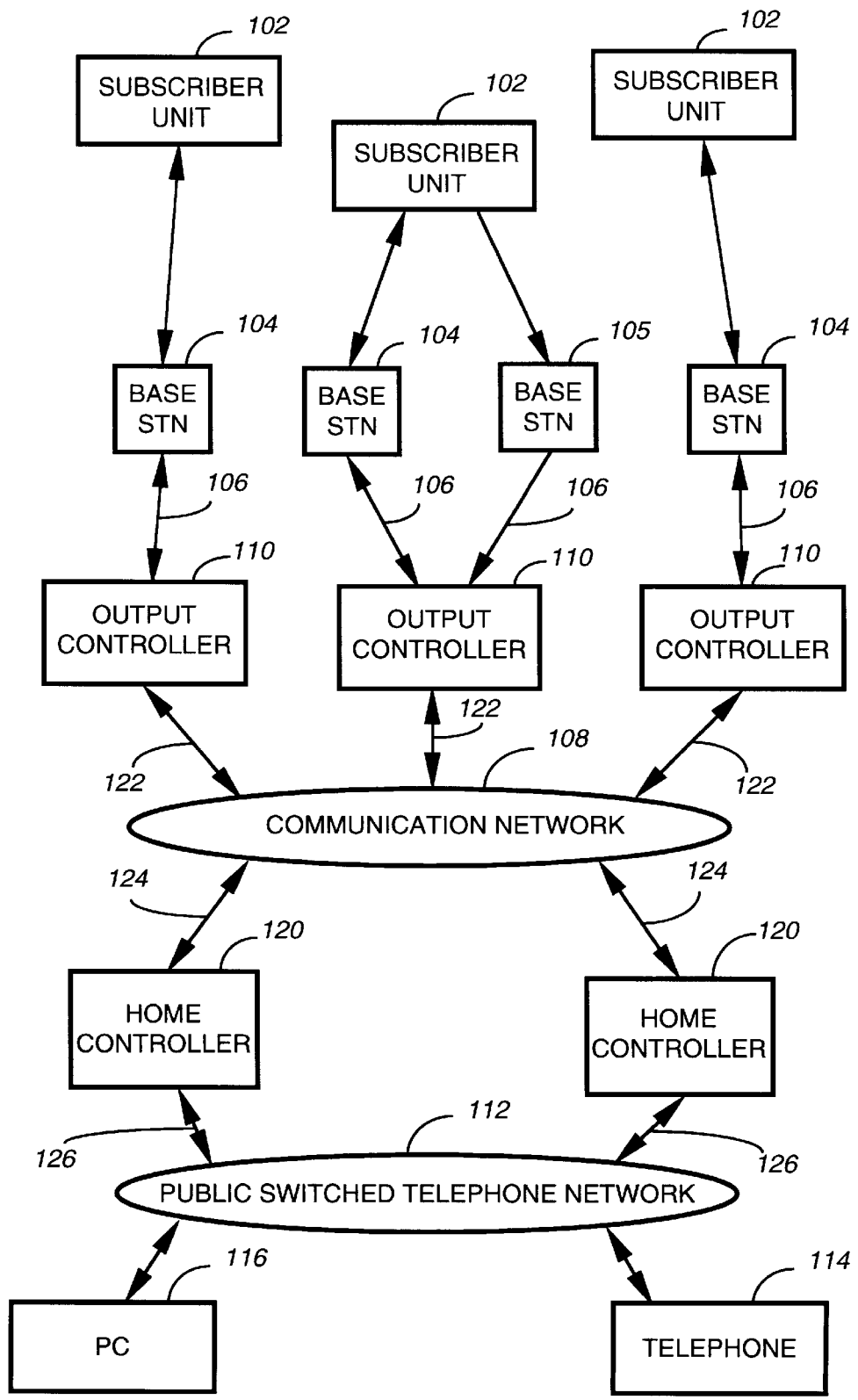
FIG. 1 is an electrical block diagram of a two-way messaging system in accordance with the present invention.

Referring to FIG. 1, an electrical block diagram of a two-way messaging system in accordance with the present invention comprises a plurality of subscriber units 102, which communicate by radio with a fixed portion of the radio system, comprising a plurality of base stations 104 and a plurality of output controllers 110. The base stations 104 are coupled via communication links 106 to the plurality of output controllers 110 for control by and communication with the plurality of output controllers 110 utilizing well-known techniques. The base stations 104 can comprise collocated transmitters and receivers, transmitters only, or additional base station receivers only, as necessary to meet system radio frequency (RF) coverage requirements. An example of a receiver-only base station is the base station 105. The output controllers 110 are coupled to a plurality of home controllers 120 via communication links 122, 124, and via a conventional communication network 108 for receiving the selective call messages from the home controllers 120. The home controllers 120 and the output controllers 110 preferably communicate by utilizing a well-known protocol, e.g., the Telocator Network Paging Protocol (TNPP), the Wireless Messaging transfer Protocol (WMtp™), or the InterPaging Networking Protocol (IPNP). It will be appreciated that, alternatively, ones of the home controllers 120 and ones of the output controllers can be collocated. The home controllers 120 are preferably coupled via telephone links 126 to a public switched telephone network 112 (PSTN) for receiving the messages from message originators utilizing, for example, a telephone 114 or a personal computer 116 to originate the messages. It will be appreciated that, alternatively, other types of communication networks, e.g., packet switched networks, local area networks, and the Internet can be utilized as well for transporting originated messages to the home controllers 120. The hardware of the home controllers 120 is preferably similar to the Wireless Messaging Gateway (WMG™) Administrator! paging terminal, while the hardware of the output controllers 110 is preferably similar to that of the RF-Conductor!™ message distributor, both manufactured by Motorola, Inc. of Schaumburg, Ill. The hardware of the base stations 104 is preferably similar to that of the Nucleus® Orchestra! transmitter and the RF-Audience!™ inbound base receiver manufactured by Motorola, Inc. It will be appreciated that other similar hardware can be utilized as well for the home controllers 120, the output controllers 110, and the base stations 104.

The protocol utilized for transmitting the messages between the base stations 104 and the subscriber units 102 is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other similar messaging protocols can be used as well. Preferably, the modulation technique utilized for the outbound channels is four-level frequency shift keyed (FSK) modulation. Preferably, the modulation technique utilized for the inbound channels is a hybrid frequency hopping direct sequence modulation technique. Inbound channel messages comprise both scheduled and non-scheduled (ALOHA) messages. In accordance with the present invention, the scheduled messages and the ALOHA messages are transmitted simultaneously using orthogonal frequency hopping patterns. Here, the word "orthogonal" means that the same frequency is never used simultaneously for both scheduled and ALOHA transmissions.

Figure 2:
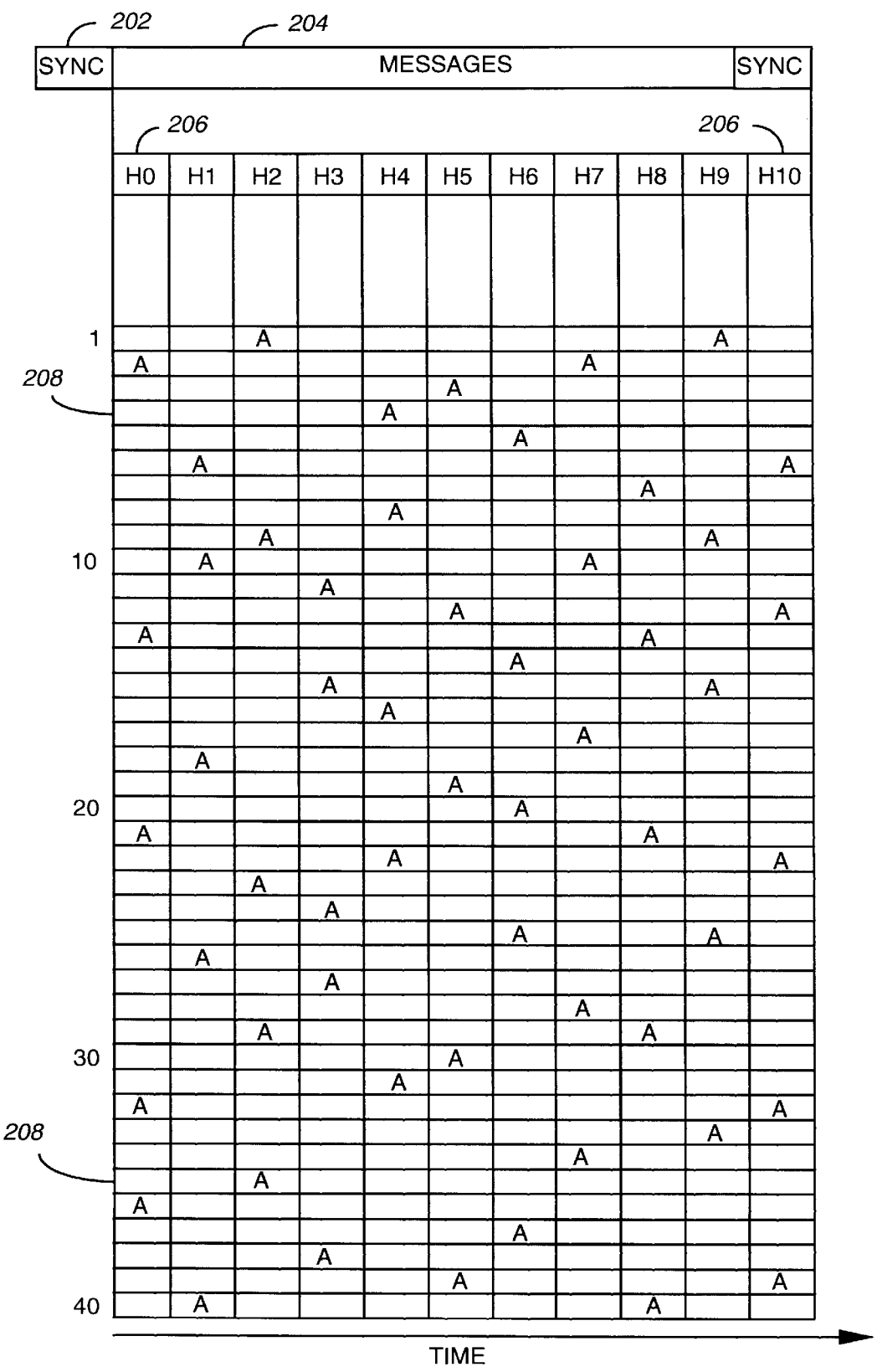
FIG. 2 is a timing diagram depicting inbound channel frequency hopping slots in accordance with the present invention.

Referring to FIG. 2, a timing diagram 200 depicts inbound channel frequency hopping slots in accordance with the present invention. The columns 206 represent eleven hopping slots per FLEX™ frame 202, 204. The rows 208 represent forty frequencies utilized for inbound channel transmissions. ALOHA transmissions are indicated by the letter "A." Unmarked slots represent scheduled transmissions. As can be seen, five of the forty frequencies are used for ALOHA transmissions during each hopping slot, while thirty-five are used for scheduled transmissions. It will be appreciated that the number of frequencies used for ALOHA transmissions in each hopping slot can be varied dependent upon relative traffic requirements for scheduled and ALOHA messages. By transmitting ALOHA messages and scheduled messages simultaneously in the manner depicted in the diagram 200, message latency is advantageously reduced compared to prior art methods, which have used TDD techniques for separating ALOHA and scheduled messages.

Figure 3:
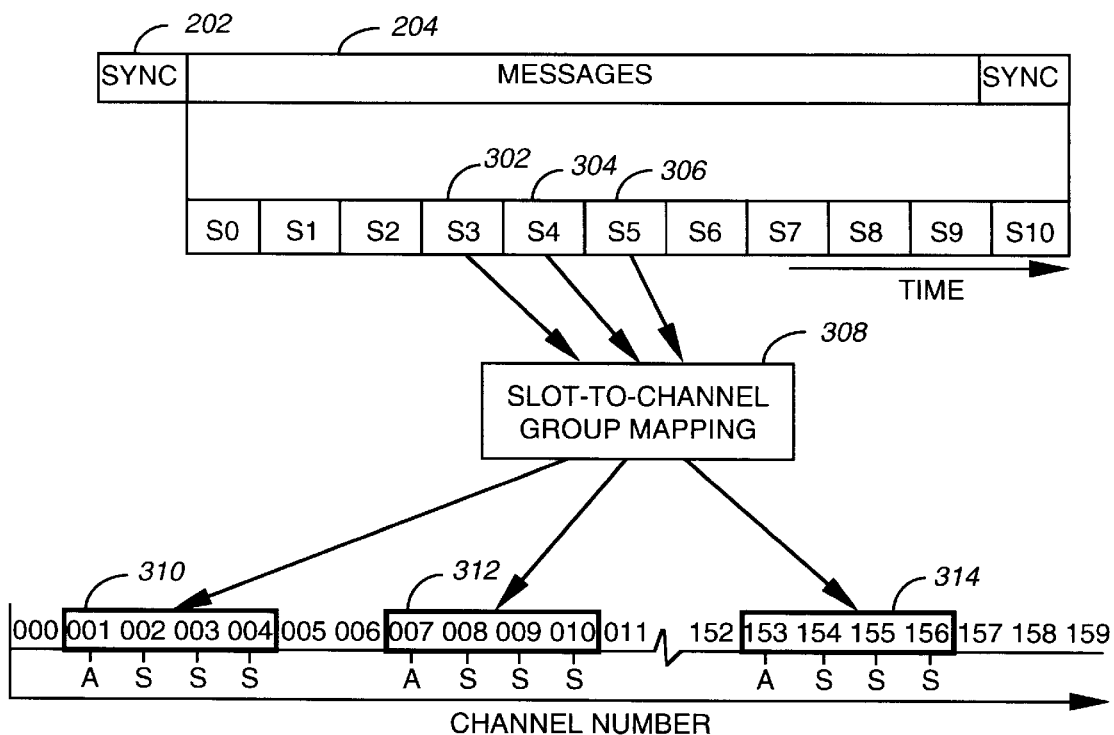
FIG. 3 is a timing diagram depicting dynamic determination of frequency groups corresponding to inbound channel timeslots in accordance with the present invention.

Referring to FIG. 3, a timing diagram 300 depicts dynamic determination of frequency groups corresponding to inbound channel timeslots in accordance with the present invention. As depicted in the diagram 300, the inbound channel preferably comprises eleven timeslots S0–S10, which are synchronized with the outbound channel frame 202, 204. By way of example, only four frequencies are required for inbound traffic, one for ALOHA messages and three for scheduled messages. Federal Communications Commission (FCC) rules, however, can require each device operating in certain bands to operate on a minimum number of, e.g., 50, hopping frequencies. To meet the FCC requirements in the ISM band, for example, 157 groups of four channels have been defined. The portable subscriber unit 102 is programmed to operate a modulo 157 counter to keep track of the slot number used for inbound transmissions. Slot numbers are mapped into frequencies to be used for inbound transmissions. Selection of a slot number to be used for a next inbound transmission is performed in a manner that satisfies the FCC requirements for transmitting on at least fifty different frequencies before repeating any frequency. The diagram 300, for example, depicts that at a given point in the slot numbering sequence the slot 302 maps into a frequency group 310 comprising channels 1–4. The slot 304 maps into a frequency group 312 comprising channels 7–10. The slot 306 maps into a frequency group 314 comprising channels 153–156. In each of the frequency groups 310, 312, 314 the first channel is used for ALOHA transmissions, while the remaining three channels are used for scheduled messages. It will be appreciated that, alternatively, many other frequency assignment patterns can be utilized in accordance with the present invention.

Figure 4:
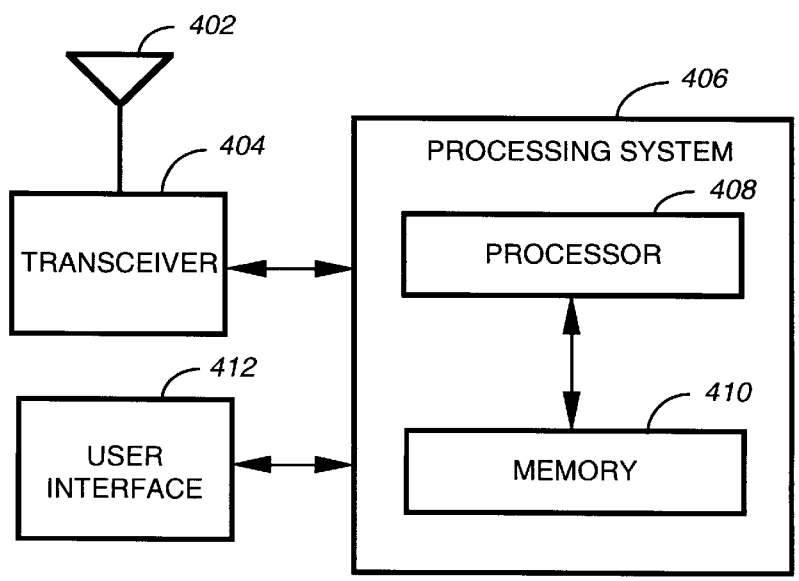
FIG. 4 is an electrical block diagram of a portable subscriber unit in accordance with the present invention.

Referring to FIG. 4, an electrical block diagram depicts the portable subscriber unit 102 in accordance with the present invention, comprising an antenna 402 for emitting and intercepting inbound and outbound messages, respectively. The portable subscriber unit 102 further comprises a conventional transceiver 404 coupled to the antenna 402 for transmitting and receiving the messages. The transceiver 404 is coupled to a processing system 406 for processing the messages. The processing system 406 is coupled to a conventional user interface 412 for conveying the messages to a user and for providing user control of the portable subscriber unit 102 utilizing well-known techniques. The processing system 406 comprises a conventional processor 408 for controlling the portable subscriber unit 102. The processing system 406 further comprises a conventional memory 410 which contains software elements for programming the processing system 406 in accordance with the present invention.

By way of the software elements the processing system 406 is programmed to control the transceiver 404 to utilize a frequency-hopped spread-spectrum modulation technique on a set of hopping frequencies. The processing system 406 is further programmed to define first and second subsets of the set of hopping frequencies, the first and second subsets being orthogonal to one another, and to control the transceiver 404 to communicate scheduled transmissions on the first subset, and to communicate ALOHA transmissions on the second subset. The processing system 406 is further programmed to define a plurality of frequency groups, a frequency group corresponding to an inbound channel timeslot, and to dynamically determine the first and second subsets from the frequency group corresponding to the inbound channel timeslot being utilized when the scheduled and ALOHA transmissions are communicated. (An example of dynamic mapping of frequency groups was presented in the diagram 300 and in the associated text herein above.)

The processing system 406 is further programmed to adjust sizes of the first and second subsets relative to one another, responsive to relative traffic requirements for the scheduled transmissions and for the ALOHA transmissions. For example, if 25 percent of the traffic is ALOHA traffic, then 25 percent of the inbound hopping frequencies can be assigned to ALOHA traffic, while the remainder are assigned to scheduled traffic. The processing system 406 is also programmed to modify the set of hopping frequencies to achieve a different frequency distribution. For example, if the hopping frequencies are grouped tightly together, it can be desirable to select different frequencies that are spread further apart in order to achieve greater frequency diversity.

In addition, the processing system 406 is programmed to classify messages according to at least one of a code rate, a data rate, and a message size; and to transmit the messages in groups having a common classification. This can be accomplished, for example, by separately queuing messages by code rate, data rate, and message size, and then transmitting the queues sequentially at predetermined times.

Figure 5:
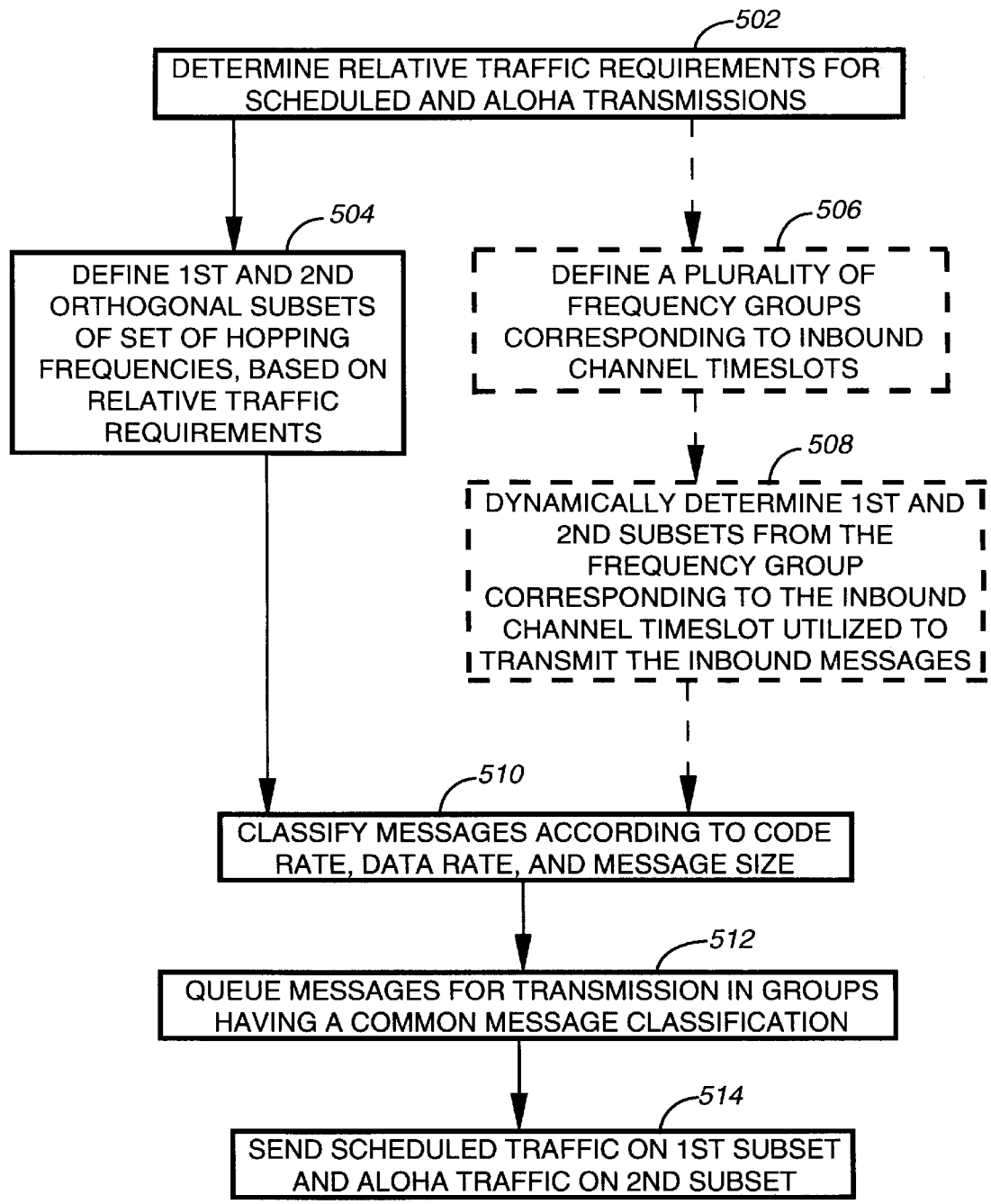
FIG. 5 is a flow chart depicting operation of the two-way messaging system in accordance with the present invention.

Referring to FIG. 5, a flow chart depicts operation of the two-way messaging system in accordance with the present invention. First, the relative traffic requirements for scheduled and ALOHA transmissions are determined 502 for the system. The relative traffic requirements preferably are determined by the output controller 110 by monitoring inbound traffic over a predetermined period. The output controller 110 then conveys the information to the portable subscriber unit 102 through command and control messages of the protocol. Alternatively, the relative traffic requirements can be pre-programmed into the system based on historical data. Next, the processing system 406 defines 504 first and second orthogonal subsets of a set of hopping frequencies, based on the relative traffic requirements. For example, if there are 100 hopping frequencies that can be used, and if 10 percent of the inbound messages are ALOHA messages, then 10 of the hopping frequencies should be assigned to ALOHA traffic and 90 assigned to scheduled traffic.

Alternatively, for systems in which only a limited number of inbound channels are required for communication, and in which FCC rules require a minimum number of frequencies to be utilized, a plurality of frequency groups are defined 506, each group corresponding to an inbound channel timeslot. Then, at the time of transmission the first and second subsets are dynamically determined 508 from the frequency group corresponding to the inbound channel timeslot utilized for transmitting the inbound message. This is accomplished according to FIG. 3 and the discussion thereof herein above.

After the first and second subsets have been determined, the processing system 406 classifies 510 any messages needing to be sent according to code rate, data rate, and message size. The processing system 406 then queues 512 the messages for transmission in groups having a common message classification, so that groups of messages having a common message classification can be transmitted at predetermined times. The processing system 406 then simultaneously sends 514 the scheduled traffic on the first subset of frequencies and sends the ALOHA traffic on the second subset of frequencies.

Thus it should be clear by now that the present invention provides a method and apparatus for facilitating inbound channel access. The present invention advantageously allows simultaneous transmission of both scheduled and ALOHA traffic, thereby minimizing message latency.

While the foregoing has disclosed by way of example an embodiment in accordance with the present invention, it will be appreciated that many alternative embodiments in accordance with the present invention may occur to one of ordinary skill in the art, given the teachings of this disclosure. Consequently, the scope of the invention is delimited only in accordance with the following claims.

What is claimed is:

1. A method in a two-way messaging system utilizing a frequency-hopped spread-spectrum modulation technique on a set of hopping frequencies, the method for facilitating inbound channel access, the method comprising the steps of:

defining first and second subsets of the set of hopping frequencies, the first and second subsets being orthogonal to one another;

communicating scheduled transmissions on the first subset; and communicating ALOHA transmissions on the second subset.

2. The method of claim 1, wherein the defining step comprises the steps of:

defining a plurality of frequency groups, a frequency group corresponding to an inbound channel timeslot; and dynamically determining the first and second subsets from the frequency group corresponding to the inbound channel timeslot being utilized when the scheduled and ALOHA transmissions are communicated.

3. The method of claim 1, wherein the defining step comprises the step of adjusting sizes of the first and second subsets relative to one another, responsive to relative traffic requirements for the scheduled transmissions and for the ALOHA transmissions.

4. The method of claim 1, further comprising the step of modifying the set of hopping frequencies to achieve a different frequency distribution.

5. The method of claim 1, further comprising the steps of:

classifying messages according to at least one of a code rate, a data rate, and a message size; and transmitting the messages in groups having a common classification.

6. A portable subscriber unit in a two-way messaging system utilizing a frequency-hopped spread-spectrum modulation technique on a set of hopping frequencies, the portable subscriber unit comprising:

a transceiver for receiving a message from the messaging system and for generating both scheduled and ALOHA transmissions intended for the messaging system; and a processing system coupled to the transceiver for defining first and second subsets of the set of hopping frequencies, the first and second subsets being orthogonal to one another, wherein the processing system is programmed to control the transceiver to communicate scheduled transmissions on the first subset, and to communicate ALOHA transmissions on the second subset.

7. The portable subscriber unit of claim 6, wherein the processing system is further programmed to define a plurality of frequency groups, a frequency group corresponding to an inbound channel timeslot, and to dynamically determine the first and second subsets from the frequency group corresponding to the inbound channel timeslot being utilized when the scheduled and ALOHA transmissions are communicated.

8. The portable subscriber unit of claim 6, wherein the processing system is further programmed to adjust sizes of the first and second subsets relative to one another, responsive to relative traffic requirements for the scheduled transmissions and for the ALOHA transmissions.

9. The portable subscriber unit of claim 6, wherein the processing system is further programmed to modify the set of hopping frequencies to achieve a different frequency distribution.

10. The portable subscriber unit of claim 6, wherein the processing system is further programmed to classify messages according to at least one of a code rate, a data rate, and a message size; and to transmit the messages in groups having a common classification.

11. An apparatus in a two-way messaging system utilizing a frequency-hopped spread-spectrum modulation technique on a set of hopping frequencies, the apparatus comprising:

transceiver means for receiving a message from the messaging system and for generating both scheduled and ALOHA transmissions intended for the messaging system; and processing means coupled to the transceiver means for defining first and second subsets of the set of hopping frequencies, the first and second subsets being orthogonal to one another, wherein the processing means is programmed to control the transceiver means to communicate scheduled transmissions on the first subset, and to communicate ALOHA transmissions on the second subset.

12. The apparatus of claim 11, wherein the processing means is further programmed to define a plurality of frequency groups, a frequency group corresponding to an inbound channel timeslot, and to dynamically determine the first and second subsets from the frequency group corresponding to the inbound channel timeslot being utilized when the scheduled and ALOHA transmissions are communicated.

13. The apparatus of claim 11, wherein the processing means is further programmed to adjust sizes of the first and second subsets relative to one another, responsive to relative traffic requirements for the scheduled transmissions and for the ALOHA transmissions.

14. The apparatus of claim 11, wherein the processing means is further programmed to modify the set of hopping frequencies to achieve a different frequency distribution.

15. The apparatus of claim 11, wherein the processing means is further programmed to classify messages according to at least one of a code rate, a data rate, and a message size; and to transmit the messages in groups having a common classification.

* * * * *